United States Patent [19]

Golshani et al.

[11] Patent Number: 5,623,667
[45] Date of Patent: Apr. 22, 1997

[54] OPERATING SYSTEM TRANSLATOR INCORPORATING UNIX ALIASING CAPABILITY FOR A PROPRIETARY OPERATING SYSTEM

[75] Inventors: Forouzan Golshani, Paradise Valley; Thomas H. Howell, Scottsdale, both of Ariz.

[73] Assignee: Bull HN Information Systems Inc., Billierca, Mass.

[21] Appl. No.: 443,859

[22] Filed: May 22, 1995

[51] Int. Cl.⁶ .................................................. G06F 9/45
[52] U.S. Cl. .................................................. 395/705
[58] Field of Search .................................... 395/650, 700, 395/600

[56] References Cited

U.S. PATENT DOCUMENTS

| | | | |
|---|---|---|---|
| 5,339,434 | 8/1994 | Rusis | 395/700 |
| 5,390,314 | 2/1995 | Swanson | 395/500 |

*Primary Examiner*—Alvin E. Oberley
*Assistant Examiner*—Alice Y. Park
*Attorney, Agent, or Firm*—JH Phillips; JS Solakian

[57] ABSTRACT

U2G is a software tool that runs on the GCOS-8 operating system and enables it recognize and process the commonly used commands of the UNIX operating system. U2G is a UNIX-GCOS-8 translator that enables the GCOS-8 to recognize, accept and execute UNIX commands. Thus, it enables the UNIX users to work with the GCOS-8 system without prior training. U2G can translate the most commonly used UNIX commands along with their respective options into equivalent GCOS-8 Time Sharing System (TSS) commands. U2G can be used with a "Verbose" mode option which serves to provide descriptive information about the commands and the translation process. U2G has on-line help screens and "explain" pages for all of the important concepts and equivalences. U2G enhances the capabilities of GCOS-8 by supporting the important UNIX concept of "aliasing" and the use of shell variables.

4 Claims, 11 Drawing Sheets

Microfiche Appendix Included
(1 Microfiche, 57 Pages)

OPERATING SYSTEM TRANSLATOR INCORPORATING UNIX ALIASING CAPABILITY FOR A PROPRIETARY OPERATING SYSTEM

FIELD OF THE INVENTION

This invention relates to the field of computers and, more particularly to computer operating systems. Still more specifically, the presently preferred embodiment of this invention relates to the two operating systems, UNIX® (registered trademark of X/Open Company Limited, hereinafter "UNIX") and GCOS® 8 (registered trademark of Bull Worldwide Information Systems, hereinafter GCOS-8), and to the translation of commands and functions between these two operating systems.

Reference to Microfiche Appendix

For a complete source code listing of a computer program which incorporates the present invention, one may refer to the Microfiche Appendix filed concurrently herewith and incorporated by reference herein.

BACKGROUND OF THE INVENTION

GCOS-8 is a proprietary operating system that provides the required basic functionalities for a family of large, powerful mainframes designed and manufactured by and for BULL. Although this operating system has many widely recognized advantages for developing data processing applications, it has, because of its application history, a rather restricted set of commands for other types of applications such as word processing, scientific computing and non-numeric programming.

On the other hand, the UNIX operating system is more flexible and offers a user a higher degree of ease of operation. It has a larger set of commands by which a user can specify the desired objectives more quickly and in a more straightforward manner. In addition, many higher education facilities have been offering access to UNIX-based systems for the past decade such that a much larger proportion of recently graduated software/computer engineers are already familiar with UNIX. Thus, an operating system translator tool that enables a user who is capable in the use of UNIX to also readily skillfully use the less widely known, but important, GCOS-8 system is highly desirable.

The main problem in designing such a tool is that there are fundamental differences between the design philosophies of these two operating systems; i.e., they were devised with different goals and assumptions in mind. Whereas GCOS-8 is directed toward hosting database systems and other data processing applications, the UNIX operating system was designed to be process oriented. The "look and feel" of these two systems have little in common, and many of the UNIX capabilities are not present in GCOS-8. Thus, development of a general interlace that can completely map these two systems to each other is a difficult task.

A software tool, U2G (trademark of Bull Worldwide Information Systems, hereinafter U2G), which incorporates the present invention, is an operating system translator that not only acts as a front-end to the GCOS-8 system, but also enhances the capabilities of the GCOS-8 environment by incorporating a number of additional capabilities that UNIX provides.

Previous attempts to design UNIX to GCOS-8 interfaces were mostly confined to translating a collection of the majority of basic commands that are common to both operating systems. With this approach, only a limited set of inter-operating system capabilities could be provided, and the more sophisticated concepts, such as piping, were not achieved. Again, these shortcomings of the prior art were, for the most part, a by-product of the fundamental differences in the design philosophies of the two systems.

OBJECTS OF THE INVENTION

It is therefore a broad object of this invention to provide a front-end user interface for the GCOS-8 operating system so that users who are familiar with the UNIX system and its operation can also use GCOS-8 with no training and with minimal knowledge of GCOS-8.

Another object of this invention is to enhance the capabilities provided by the GCOS-8 system as a result of providing a larger set of commands and functionalities.

It is a more specific object of this program to provide aliasing capability for the GCOS-8 operating system.

SUMMARY OF THE INVENTION

Briefly, these and other objects of the invention are achieved by the U2G operating system translator for translating all the commonly used UNIX commands (more commonly called UNIX utilities) into equivalent GCOS-8 commands. U2G runs on the GCOS-8 command interpreter (TSS). Many essential options of the UNIX commands are also recognized. If an unknown command is entered, U2G conservatively assumes that it is a valid GCOS-8 command (or an executable) and passes it on to the GCOS-8 command interpreter without a change. When the appropriate option is selected, U2G provides information about the translation and describes commands. This mode of operation is called the "verbose" mode and may be disabled by entering the "terse" mode. U2G also provides on-line help screens and explain pages and simulates a semi-UNIX-like environment by providing facilities for using shell variables and aliases. U2G supports I/O redirection and simple command procedures, and simulates the piping of the commands. A startup file, "u2grc", is first interpreted at the start of any session to set up the appropriate environment.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

OVERVIEW

Figure 1:
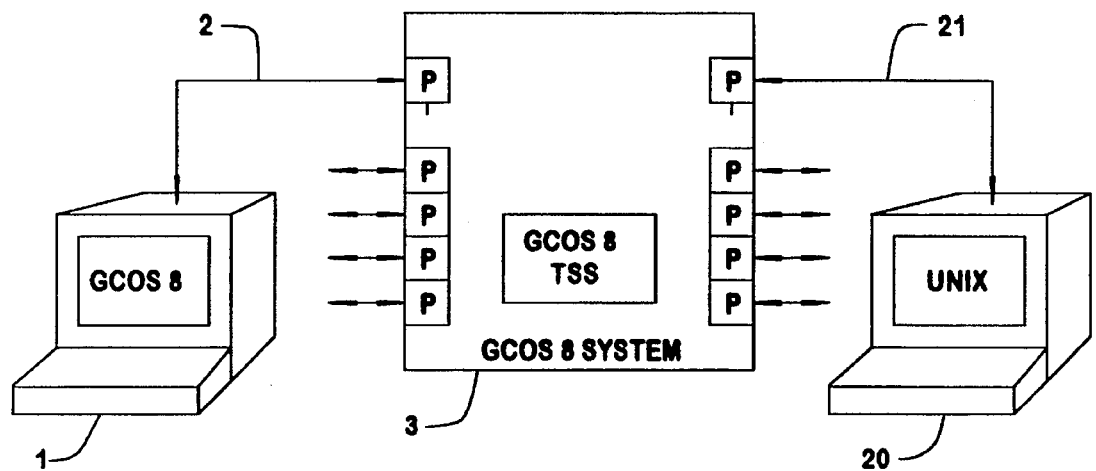
FIG. 1 is a representation of an exemplary open computer complex environment in which the invention finds application, which open computer complex environment includes proprietary GCOS-8 system components and UNIX system components.
Figure 2:
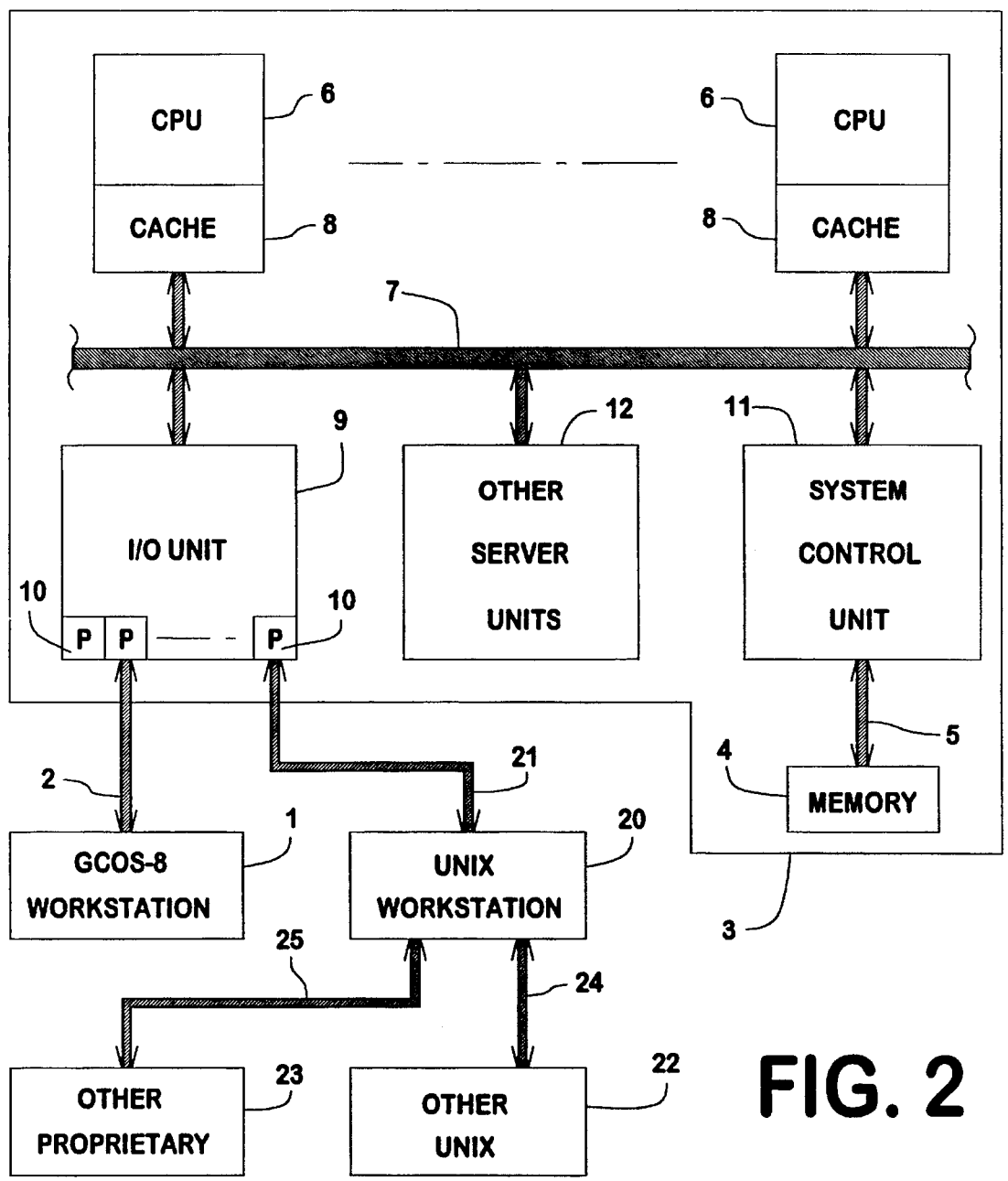
FIG. 2 is an alternative representation of the exemplary environment illustrating in more detail the apparatus of a proprietary GCOS-8 system server component of the open computer complex which includes UNIX system components.

Referring first to both FIG. 1 and FIG. 2, a GCOS-8 terminal 1 communicates with a GCOS-8 system 3 via bus 2 and I/O port (P) 10. Bus 2 is merely a representation of the connection between the terminal 1 and GCOS-8 system 3 and may actually constitute a path in a local area network (LAN), wide area network (WAN) or some other path implementation. As shown in FIG. 2, the exemplary GCOS-8 system comprises an I/O unit 9 (which includes a plurality of I/O ports 10), one or more CPUs 6 each having a cache unit 8 associated therewith which interfaces to a system bus 7, a system control unit 11 and such other system units 12 as may be included in the GCOS-8 system, all coupled to the system bus 7, and a main memory 4 which, in this configuration, interfaces to the system control unit 11.

Referring again to both FIGS. 1 and 2 and as best shown in FIG. 2, a UNIX terminal represented by workstation 20 is also coupled to a port 10 via path 21. In addition, the UNIX workstation 20 may also be coupled to other UNIX system components 22 via path 24 and also to other proprietary system components 23 (which may or may not be GCOS-8) via path 25. As those skilled in the art will appreciate, FIG. 2 represents a typical open system combined with access to one or more proprietary systems, an open complex arrangement which has the potential for enjoying the best of both environments; however, it is well known that this result is notoriously difficult to accomplish in practice.

Figure 3:
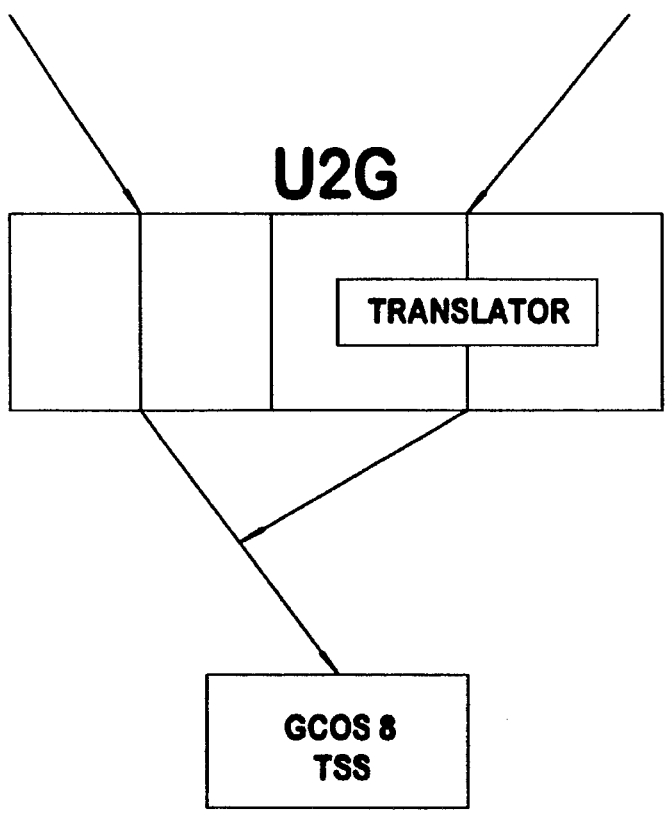
FIG. 3 is an illustration of the overall architecture of a U2G software tool which includes the subject invention.
Figure 4:
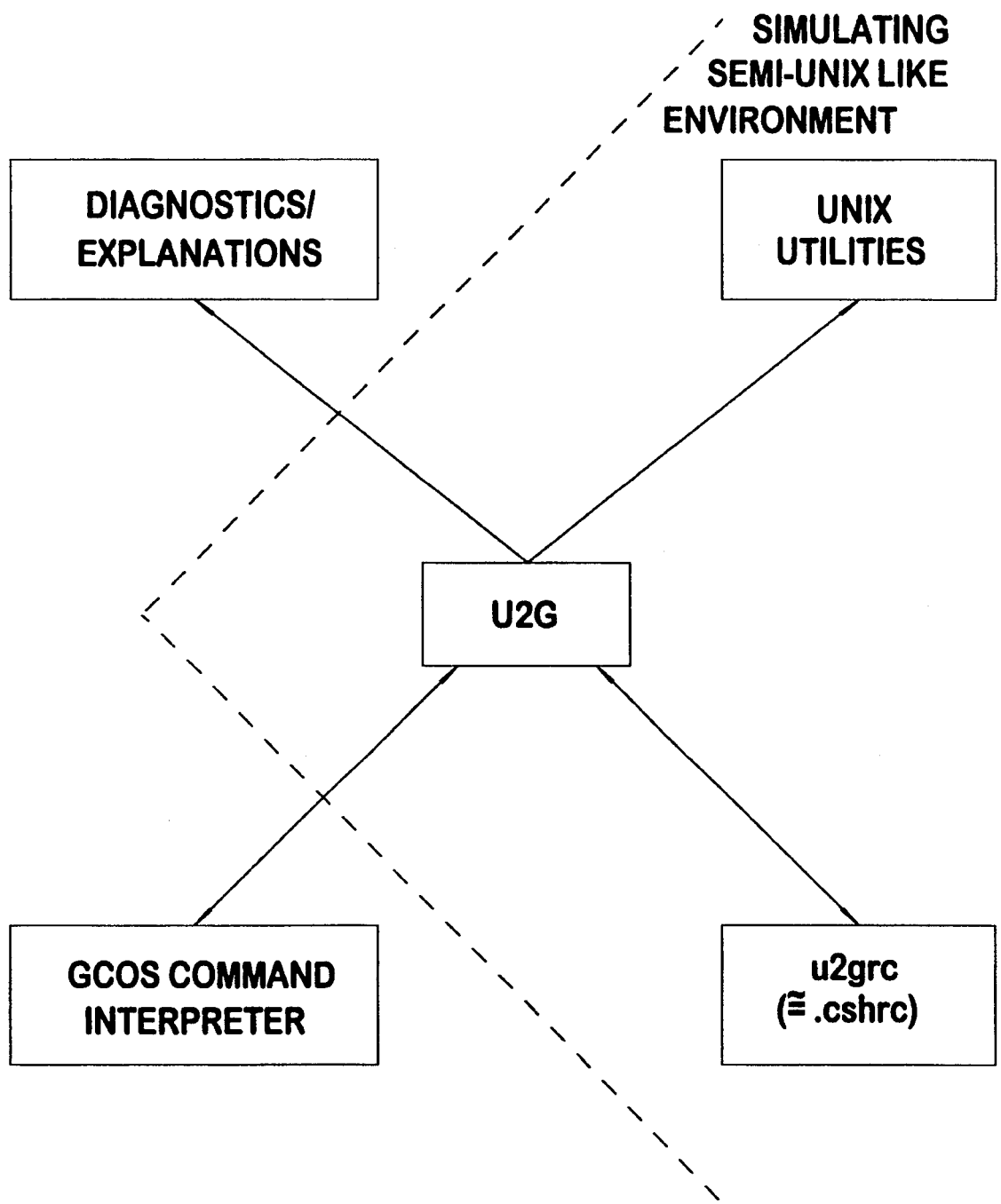
FIG. 4 is a high level block diagram of the command translator incorporated into U2G.
Figure 5:
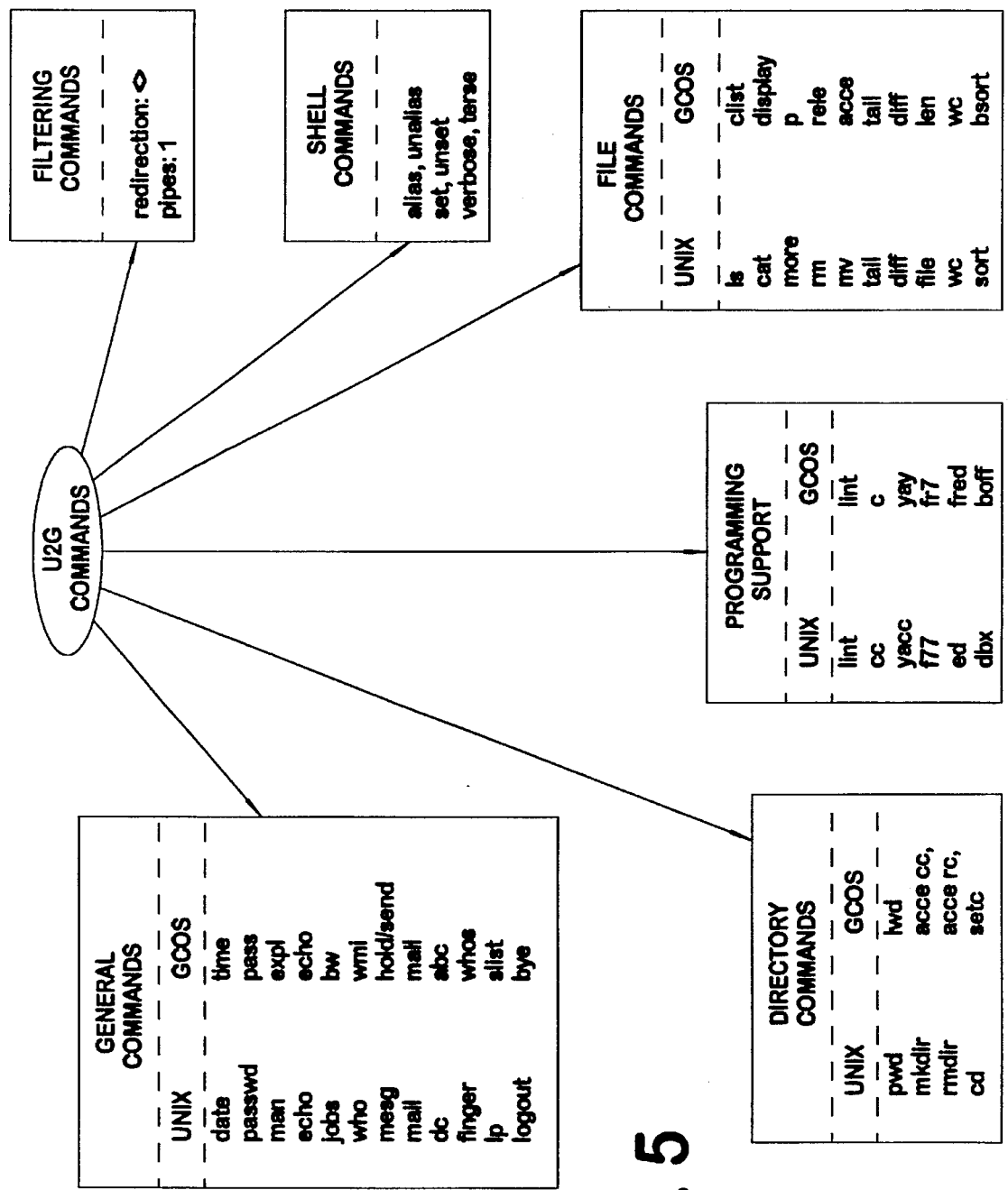
FIG. 5 illustrates the UNIX to GCOS-8 command hierarchy.

Referring now to FIG. 3 which is a very high level architectural diagram of the U2G tool, it will be understood that U2G is a translation program that runs on the GCOS-8 command interpreter (i.e., the Time Sharing System—TSS—command interpreter) and filters all user commands. A high level block diagram of the command translator per se is shown in FIG. 4. It translates the known UNIX commands to GCOS-8 commands and prints out useful diagnostics and explanations in the process. It is assumed that the users of this translator are familiar with the common commands available with at least one of the two operating systems. The more or less directly equivalent UNIX and GCOS-8 commands are categorized in FIG. 5. It will be seen that U2G can translate a rich set of essential and useful UNIX commands (more commonly called the UNIX utilities) to their equivalent GCOS-8 commands. The set of commands supported by U2G is sufficient to help UNIX users break into the GCOS-8 environment.

U2G includes a table of equivalences between UNIX and GCOS-8 commands. Many essential options (e.g., those that make a command more specific) are also recognized. Several safety features are included in U2G. Upon receiving an unknown command, U2G assumes that it is a valid GCOS-8 command or an executable and passes it on to the GCOS-8 command interpreter unchanged.

Figure 6:
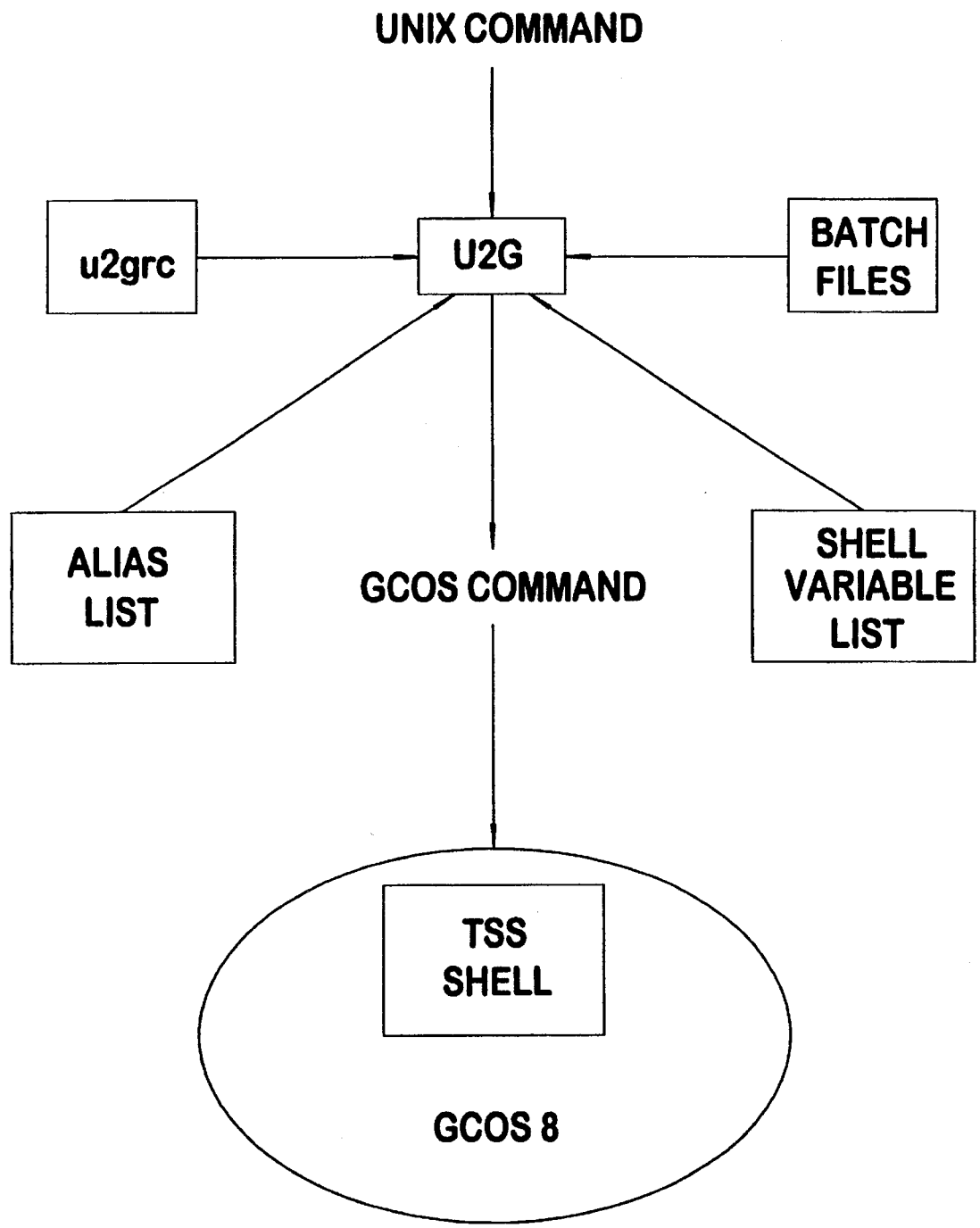
FIG. 6 is a basic UNIX to GCOS-8 flow diagram.
Figure 7:
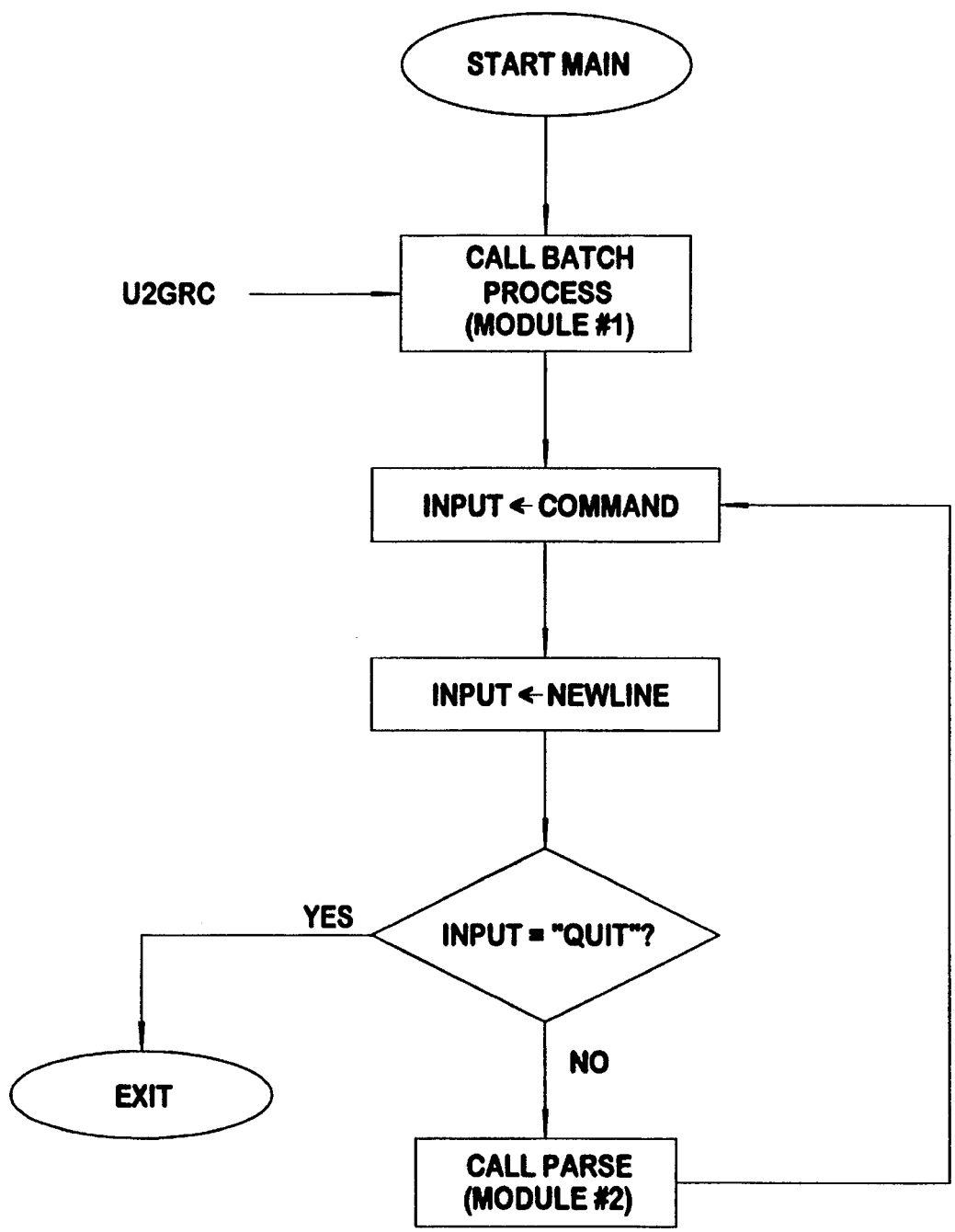
FIG. 7 is the main UNIX to GCOS-8 flow diagram.
Figure 8:
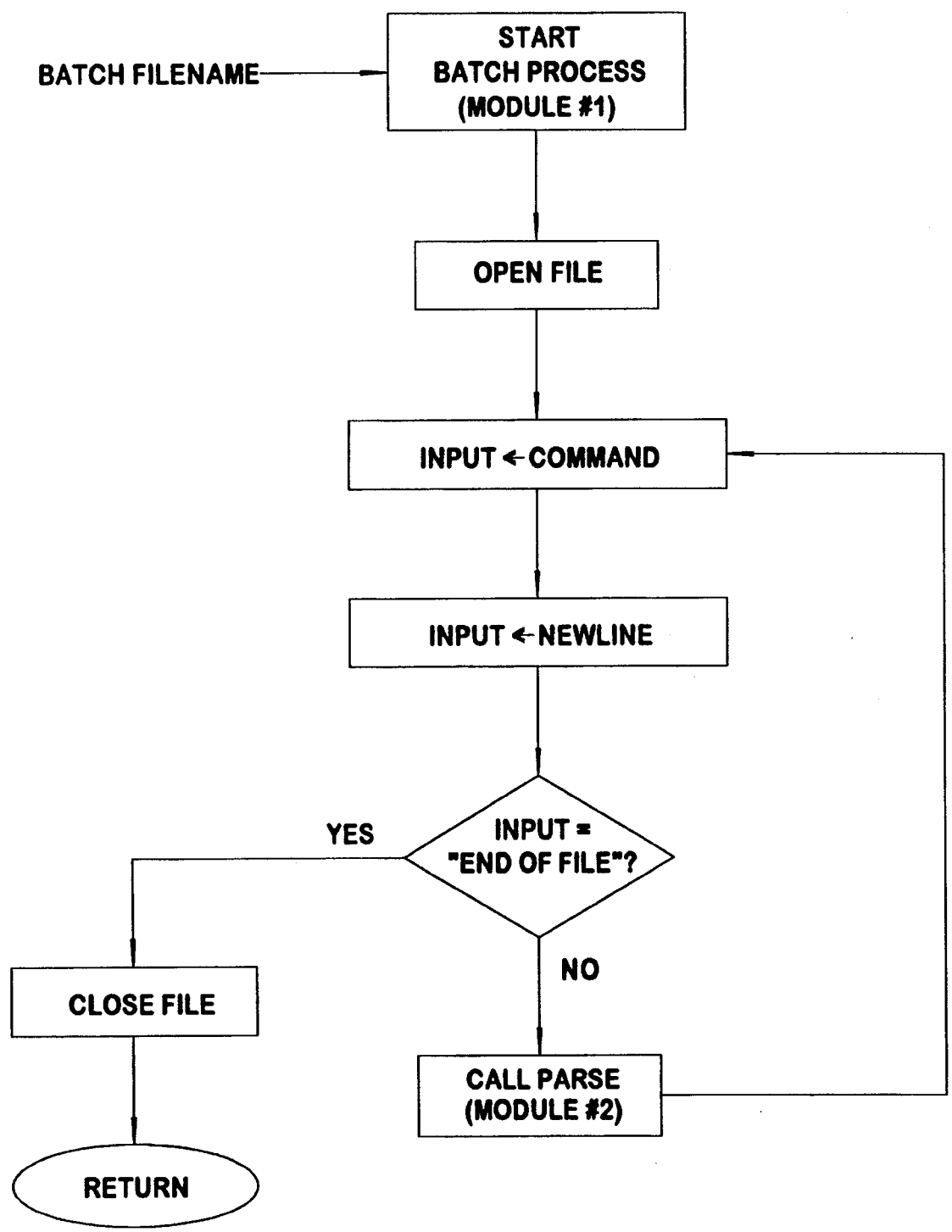
FIG. 8 is the U2G batch processing flow diagram.
Figure 9:
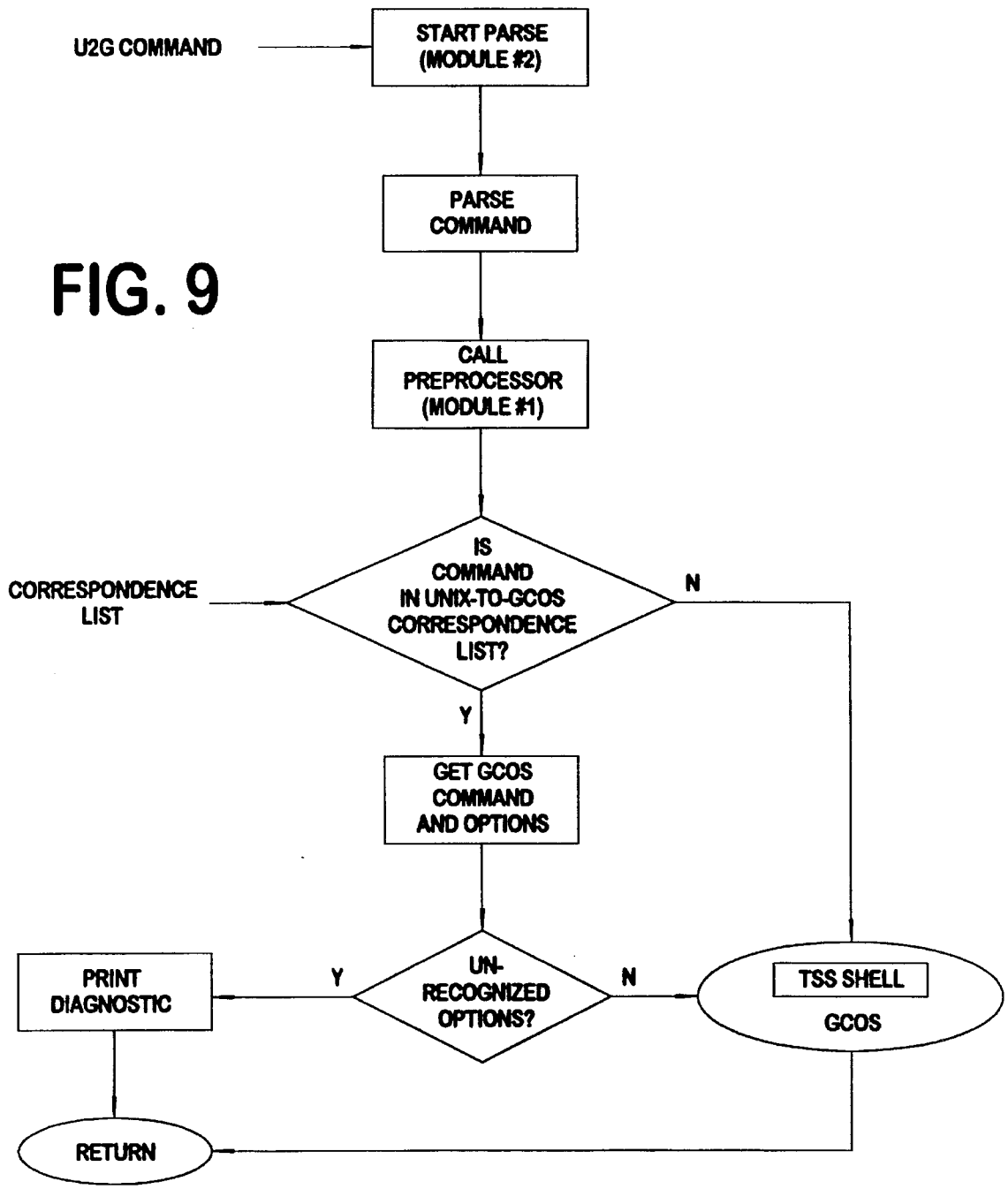
FIG. 9 is the U2G parsing flow diagram.
Figure 10:
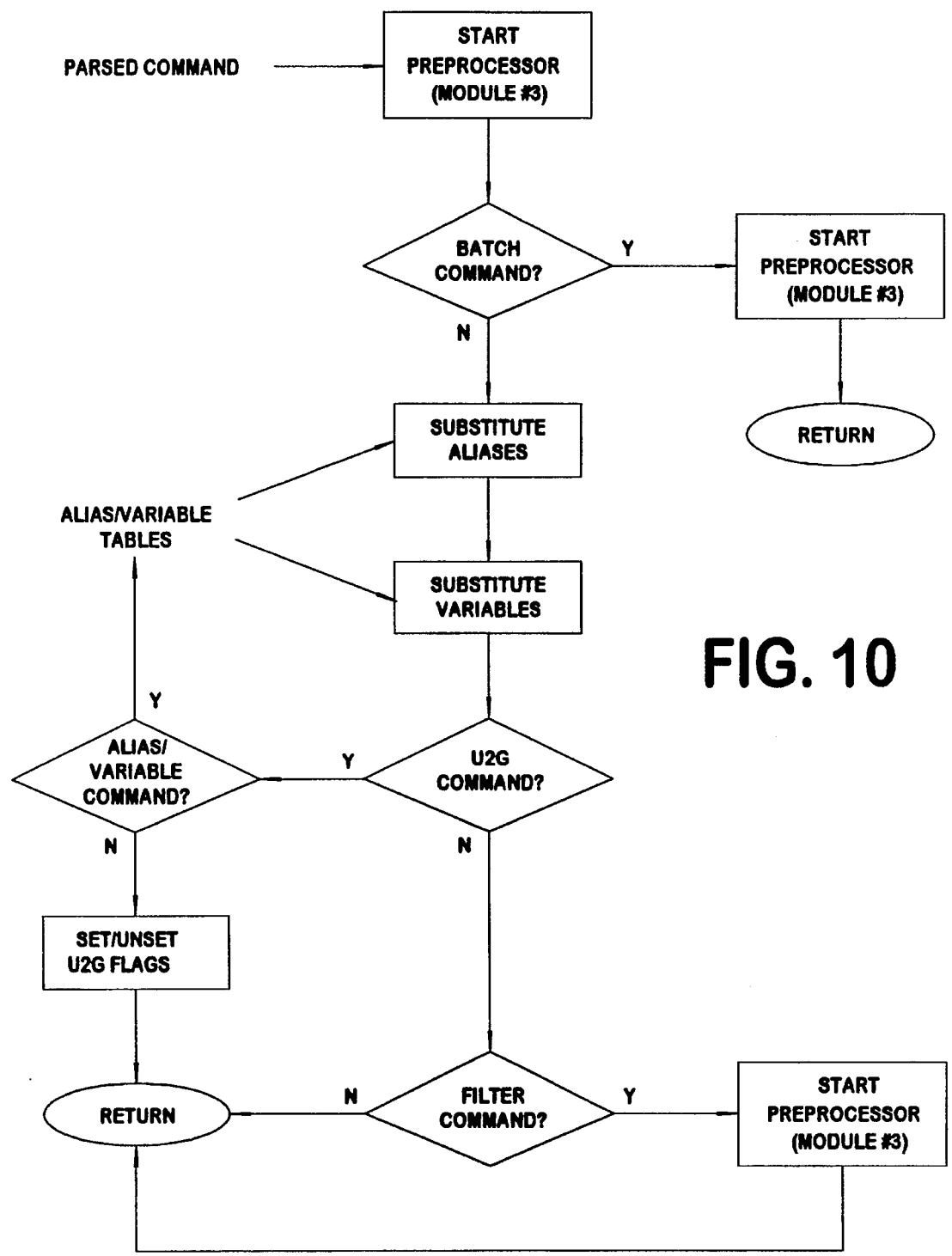
FIG. 10 is the U2G command preprocessing flow diagram.
Figure 11:
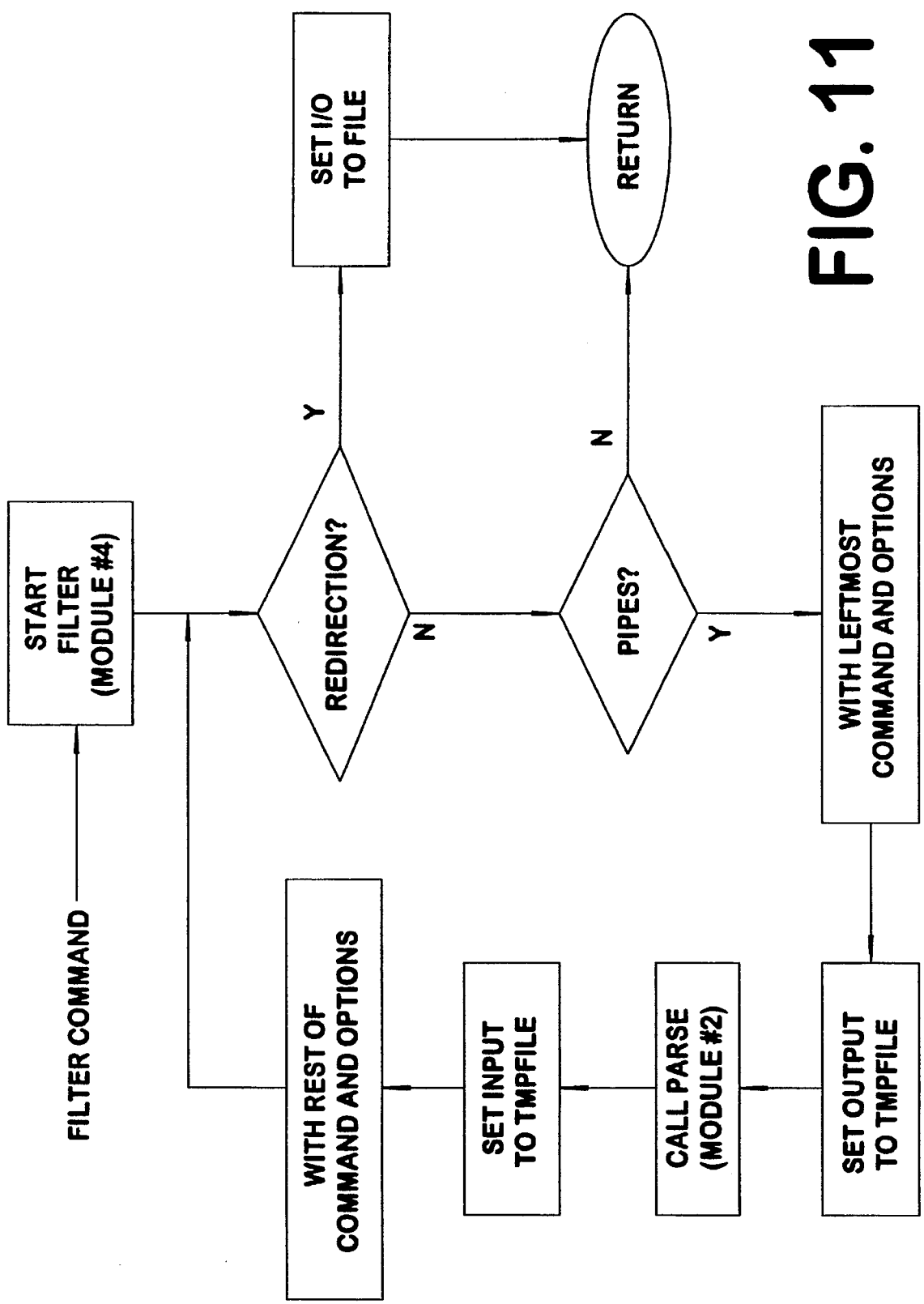
FIG. 11 is the U2G filtering flow diagram.
Figure 12:
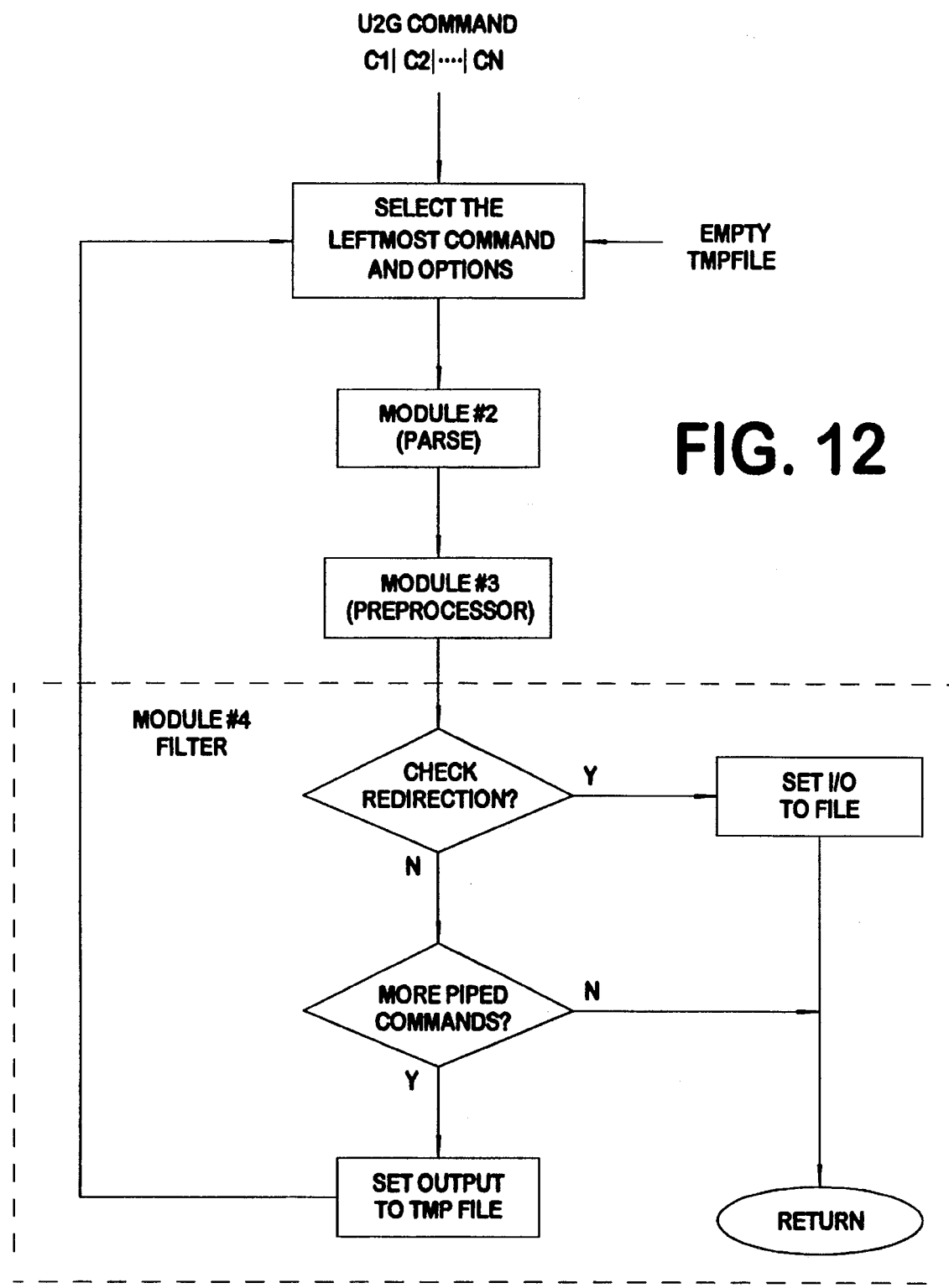
FIG. 12 is a flow diagram of an example of piping and input/output redirection in U2G.

U2G simulates a semi-UNIX like environment on GCOS-8 by providing facilities to use shell variables and aliases. As shown in FIGS. 4 and 6, a startup file "u2grc", which is much like the ".cshrc" file for the c-shell on UNIX, is first interpreted before starting a session. Commonly used aliases and other startup options can be specified in this file. Batch files consisting of a combination of GCOS-8, UNIX and U2G commands can also be interpreted by U2G. Since UNIX and GCOS-8 both use line oriented command interpreters as their primary shells, U2G is also line oriented.

U2G COMMANDS: The following commands are recognized by U2G at the command line, in the startup file and in a batch file.

ALIAS

Aliases can be defined as follows:

alias unix gcos alias long "ls-l-s"

If a name has to be aliased to more than one word, the words must be enclosed in double quotes. The command 'alias' with no arguments will list out the current list of aliased terms.

UNALIAS

Previously defined aliases can be removed by issuing the unalias command. Enter:

unalias long to remove the alias for long. The command 'unalias' used without any argument is illegal.

SET

Shell variables can be defined as follows:

set var variable set short "really long name" and used as $var and $short in any U2G command line. The command 'set' without any arguments will list out the currently defined shell variables.

UNSET

Previously defined shell variables can be unset using this command. Ex: unset var.

SETTING THE PROMPT

The prompt is a special shell variable which defaults to the '%' symbol.

Enter:

set prompt MY_PROMPT where MY_PROMPT is any valid string, to set the prompt to MY_PROMPT in the rest of the session with U2G.

VERBOSE

The user can set U2G to operate in a verbose mode by issuing this command. In this mode, U2G generates elaborate messages after each command describing everything about that command that could be helpful to the user. Command equivalences are shown, and diagnostic messages are produced.

TERSE

In this mode, the elaborate command descriptions are not produced; it is therefore most often used by experienced users.

BATCH FILES

Any combination of GCOS-8, UNIX and U2G commands can be collected together in a file and executed by U2G using the command '@filename' where filename is the name of the batch file containing the commands. Batch file executions may be nested in the sense that one batch file can contain a line invoking another batch file.

STARTUP FILE

During every run of U2G, a file named "u2grc" in the user's current directory is interpreted as a startup file.

KNOWN UNIX COMMANDS

A sample of the UNIX commands that are currently known to U2G are listed below. (Options are given in parentheses.) Attention is again invited to FIG. 5.

```
File commands:

ls (-ls)      cat       more      tail      diff
rm            cp        mv        wc        file
sort
Directory commands:

pwd           mkdir     rmdir     cd
Programming support:

lint          cc        yacc      f77       ed
dbx
General commands:

date          passwd    man       echo      jobs
who           mesg      mail      dc        finger
lp            logout
```

PROCESS FLOW

It will be understood that the foregoing, in conjunction with FIGS. 1–12, inclusive, and the Microfiche Appendix referenced above and incorporated herein by reference, constitutes a full and comprehensive exposition of the invention sufficient to teach those skilled in the art to adapt the invention to diverse operating system combinations. However, the following description of a specific example of the process flow of the invention will provide a useful alternative disclosure which obviates the need to refer to the Microfiche Appendix.

SPECIFIC EXAMPLES

Many operating systems, including GCOS-8, do not enjoy the capability for allowing an individual user to designate more facile names (i.e., names that are better suited to the user's taste or predilection) for various available operating system commands. On the other hand, this feature is considered to be a distinct strength of the UNIX operating system. The U2G tool provides such a facility to the users of the GCOS-8 system by simulating a UNIX-like environment in which a substantial degree of the UNIX capabilities are available to the users.

To introduce a new alias, at the prompt, a user types the command "alias" followed by the new chosen name and then the original name. Thus, if it is desired to use the command "List_all" instead of the usual command "ls" for the listing of all files, file user enters the following line:

% alias List_all ls

After the execution of the above line, the system will recognize "List_all" as an alternative to "ls". Consider that two other aliases are added.

% alias ser cp

% alias uuu more

The user can now ask for a listing of all aliases entered by typing

"% alias"

The system will respond by providing the list as follows:

List_all ls ser cp uuu more

Should any of the command aliases be entered, the system will execute the appropriate corresponding command. For example:

% alias fast terse will introduce a new alias for terse mode. If the subsequent entry is made:

% fast the system will respond:

terse mode on

To remove an alias, the command "unalias" is used. For example:

% unalias fast will eliminate the previously entered alias for terse. Should the old alias be used again, the system will indicate the error. For example:

% fast will cause the response:

fast: not found

The foregoing examples are not exhaustive, but show only a sample of what can be accomplished with the system along with the responses. While the examples and functional description set forth above independently teach the invention to those skilled in the art, a comprehensive implementation of the presently preferred embodiment is separately revealed in the Microfiche Appendix filed concurrently herewith and incorporated by reference herein.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. An open computer complex comprising:

A) a first computer system operating under the GCOS-8 operating system having a first operating system command repertoire;

B) a second computer system operating under the UNIX operating system having a second operating system command repertoire;

C) at least one of said first computer system and said second computer system further including a user terminal; and D) interface means connecting said first and second computer systems, said interface means including an operating system translator, said operating system translator comprising:

1) a table of equivalent commands which are included in said first operating system command repertoire and said second operating system command repertoire, said table of equivalents including the following equivalent file operating system commands:

| UNIX | GCOS-8 |
|------|--------|
| ls   | clist  |
| cat  | display |
| more | p      |
| rm   | rele   |
| mv   | acce   |
| tail | tail   |
| diff | diff   |
| file | len    |

-continued

| UNIX | GCOS-8 |
|------|--------|
| wc   | wc     |
| sort | bsort  |

2) means for receiving an operating system command from said second operating system command repertoire which is to be executed in said first computer system;
3) means for determining from said table an operating system command in said first operating system command repertoire which is an equivalent operating system command of said operating system command from said second operating system command repertoire which is to be executed in said first computer system;
4) means for executing said equivalent operating system command in said first computer system; and
5) virtual aliasing means responsive to the reception of an aliasing command from said UNIX operating system for accessing said aliasing capability in said UNIX operating system on behalf of said GCOS-8 operating system, said virtual aliasing capability being invoked by manual entry at said user terminal of an "alias unix gcos" operating system translator command followed by an "alias" operating system command in conjunction with the specification of a command from said UNIX operating system command repertoire which is to be aliased, said virtual aliasing capability being disabled by manual entry of an "unalias" UNIX operating system command in conjunction with the specification of said UNIX operating system command which was previously aliased;

whereby, virtual aliasing capability is available for said GCOS-8 operating system.

2. The open computer complex of claim 1 in which said table of equivalent operating system commands in said GCOS-8 operating system command repertoire and said UNIX operating system command repertoire includes the following equivalent programming support operating system commands:

| UNIX | GCOS-8 |
|------|--------|
| lint | lint   |
| cc   | c      |
| yacc | yay    |
| f77  | fr7    |
| ed   | fred   |
| dbx  | boff.  |

3. The open computer complex of claim 2 in which said table of equivalent operating system commands in said GCOS-8 operating system command repertoire and said UNIX operating system command repertoire includes the following equivalent directory operating system commands:

| UNIX  | GCOS-8  |
|-------|---------|
| pwd   | lwd     |
| mkdir | acce cc,|
| rmdir | acce rc,|
| cd    | setc.   |

4. The open computer complex of claim 3 in which said table of equivalent operating system commands in said GCOS-8 operating system command repertoire and said UNIX operating system command repertoire includes the following equivalent general operating system commands:

| UNIX   | GCOS-8    |
|--------|-----------|
| date   | time      |
| passwd | pass      |
| man    | expl      |
| echo   | echo      |
| jobs   | bw        |
| who    | wmi       |
| mesg   | hold/send |
| mail   | mail      |
| dc     | abc       |
| finger | whos      |
| lp     | slist     |
| logout | bye.      |

* * * * *